US006936999B2

(12) United States Patent
Chapuis (10) Patent No.: US 6,936,999 B2
(45) Date of Patent: Aug. 30, 2005

(54) SYSTEM AND METHOD FOR CONTROLLING OUTPUT-TIMING PARAMETERS OF POWER CONVERTERS

(75) Inventor: Alain Chapuis, Morgan Hill, CA (US)

(73) Assignee: Power-One Limited (KY)

( * ) Notice: Subject to any disclaimer, the term of this patent is extended or adjusted under 35 U.S.C. 154(b) by 20 days.

(21) Appl. No.: 10/388,831

(22) Filed: Mar. 14, 2003

(65) Prior Publication Data

US 2004/0178780 A1 Sep. 16, 2004

(51) Int. Cl.⁷ .............................................. G05F 1/40
(52) U.S. Cl. ...................................................... 323/282
(58) Field of Search .............................. 323/282, 318, 323/351; 714/22

(56) References Cited

U.S. PATENT DOCUMENTS

| | | | |
|---|---|---|---|
| 3,660,672 A | | 5/1972 | Berger et al. |
| 4,194,147 A | | 3/1980 | Payne et al. |
| 4,538,073 A | | 8/1985 | Freige et al. |
| 4,538,101 A | | 8/1985 | Shimpo et al. |
| 4,622,627 A | | 11/1986 | Rodriguez et al. |
| 5,053,920 A | | 10/1991 | Staffiere et al. |
| 5,073,848 A | | 12/1991 | Steigerwald et al. |
| 5,377,090 A | | 12/1994 | Steigerwald |
| 5,481,140 A | | 1/1996 | Maruyama et al. |
| 5,990,669 A | | 11/1999 | Brown |
| 6,115,441 A | * | 9/2000 | Douglass et al. ............. 377/25 |
| 6,163,178 A | * | 12/2000 | Stark et al. .................. 327/108 |
| 6,191,566 B1 | | 2/2001 | Petricek et al. |
| 6,211,579 B1 | | 4/2001 | Blair |
| 6,262,900 B1 | | 7/2001 | Suntio .......................... 363/69 |
| 6,421,259 B1 | | 7/2002 | Brooks et al. |
| 6,429,630 B2 | | 8/2002 | Pohlman et al. |
| 2001/0033152 A1 | | 10/2001 | Pohlman et al. |
| 2002/0073347 A1 | | 6/2002 | Zafarana et al. |
| 2003/0122429 A1 | | 7/2003 | Zhang et al. |
| 2003/0142513 A1 | | 7/2003 | Vinciarelli |
| 2003/0201761 A1 | | 10/2003 | Harris |
| 2004/0027101 A1 | | 2/2004 | Vinciarelli |
| 2004/0093533 A1 | * | 5/2004 | Chapuis et al. ............... 714/22 |

OTHER PUBLICATIONS

33702 Microprocessor Power Supply (3.0A), Analog Products MC33702 Fact Sheet; Motorola/Digital dna/ Power Management Switching; pp. 1–4.

(Continued)

*Primary Examiner*—Adolf Berhane
(74) *Attorney, Agent, or Firm*—O'Melveny & Myers LLP (57) ABSTRACT

A system and method is provided for utilizing output-timing data to control at least one output timing parameter of a point-of-load ("POL") regulator. Specifically, a power supply controller ("controller") is adapted to transmit output-timing data to at least one POL regulator. In one embodiment of the present invention, each POL regulator includes an output builder, a control unit and a storage device. The control unit is adapted to store the output-timing data in the storage device. The control unit and the output builder are then adapted to produce an output having at least one output timing parameter in accordance with the output-timing data. Examples of output-timing data include sequencing data, turn-on data, turn-off data, termination data, slew-rate data, etc. For example, a POL regulator may be adapted to utilize output-timing data, or a portion thereof (e.g., slew-rate data), to generate an output having a particular slew rate. Similarly, a POL regulator may be adapted to utilize output-timing data, or a portion thereof (e.g., sequencing data, turn-on data, etc.), to determine (or calculate) a period of time to wait (e.g., delay period) before the output is generated. In other words, output-timing data can be used to produce a series of outputs in a particular order, or sequence.

35 Claims, 3 Drawing Sheets

OTHER PUBLICATIONS

"Motorola Switch Mode Power Supply With Multiple Linear Regulators And High Speed CAN Transceiver" Motorola, Inc. 2002; digital dna; Analog Marketing; Rev. 2.5, Nov. 2002; 33394; Multi–Output Power Supply Semiconductor Technical Data.

"Power Management Solutions For Networking Applications"; Presented by Luc Darmon, Smart Networks Developer Forum 2003—Jun. 4–6 Euro–Disney Paris, France; Motorola digital dna; www.motorola.com/sndf; pp. 1–26.

Preliminary Information 1.5 A Switch–Mode Power Supply With Linear Regulator, 33701; Power Supply Integrated Circuit; Motorola Semiconductor Technical Data; Analog Marketing MC33701/D Rev. 1.0, May 2003; Motorola digital dna; pp. 1–24.

"KEKB Power Supply Interface Controller Module" by A. Akiyama, T. Nakamura, M. Yoshida, T. Kubo,. N,. Yamamoto and T. Katoh; KEK, High Energy Accelerator Research Organization, Japan International Conference on Accelerator and Large Experimental Physics and Control Systems, 1997, Beijing, China; pp. 1–4.

"Magnet Power Supply Control System in KEKB Accelerators" by T.T. Nakamura, A. Akiyama, T. Katoh, Ta. Kubo, N. Yamamoto and M. Yoshida; KEK, Tsukuba, Japan International Conference on Accelerator and Large Experimental Physics Control Systems, 1999, Trieste, Italy, pp. 406–408.

"The I C–Bus Specification, Version 2.1, Jan. 2000" pp. 1–46.

"Electronics Products" by Paul Birman and Sarkis Nercessian, Kepco, Inc. Flushing NY vol. 37, No. 10, Electronic Products, Mar. 1995; The Engineer's Magazine of Product Technology; Power Supply Special; DSO Samples Single Shots at 10 Gsamples/s Speech Recognition On A Single Chip LCD Has Flat–Panel Benefits At CRT Cost Product Update: High–Performance OP AMPS; A Hearst Business Publication; pp. 1, 5, 33–34.

"System Management Bus Specification" Smart Battery System Specifications; Revision 1.1 Dec. 11, 1998; SBS Implementers Forum; Version 1.1; pp. 1–39.

* cited by examiner

SYSTEM AND METHOD FOR CONTROLLING OUTPUT-TIMING PARAMETERS OF POWER CONVERTERS

BACKGROUND OF THE INVENTION

1. Field of the Invention

The present invention relates to controlling a point-of-load ("POL") regulator output, or more particularly, to a system and method of utilizing output-timing data to control at least one output timing parameter of a POL regulator.

2. Description of Related Art

Point-of-load ("POL") regulators, which are also referred to as voltage regulators or DC/DC converters, are commonly used in conjunction with electronic circuits. This is because the voltage/current requirements of electronic circuits typically differ from the voltage that is readily available or the current that can practically be delivered. For example, some electronic devices only include a single voltage input (e.g., 12v), but require different voltages for circuits contained within (e.g., 3v, 5v, 9v, etc.). A common solution is to design multiple POL regulators within the device for converting the single input voltage into multiple voltage levels.

Similarly, some electronic devices include circuits that require low voltage (e.g., 1v), high current (e.g., 100A) power supplies. This is problematic in that it is impractical to deliver high current at low voltage levels over a relatively long distance and still meet desired regulation performances. A common solution is to use a high voltage, low current power supply and design a POL regulator near the internal circuit. This allows low current to travel throughout the device, and provides a low voltage, high current power supply (i.e., using the POL regulator) near the internal circuit.

Traditionally, POL regulators operate in conjunction with at least one power supply controller. The controller (1) activates and partially programs the POL regulator by providing data directly to the POL regulator, (2) monitors the output of the POL regulator by measuring data external to the POL regulator, and (3) allows the output of the POL regulator to be transmitted to an external load circuit by controlling an external switch. Specifically, the controller provides the POL regulator with output-voltage-set-point data and enable data. The POL regulator, in response to receiving the enable data, produces an output having a voltage level in accordance with the output-voltage-set-point data. The output of the POL regulator is then measured by the controller. If the output is correct, the controller activates an external transistor switch, which allows the output to be transmitted to the external load circuit. If a particular output slew rate is required, the controller can toggle or control linearly the external transistor switch to achieve the desired slew rate. Thus, the power supply controller controls the output timing parameters of each POL regulator (e.g., sequencing, slew rate, etc.) by controlling a plurality of external transistor switches.

The drawback with such a control system is that it adds complexity, expense and size to the control system by requiring the controller to communicate with multiple devices (e.g., a POL regulator and an external transistor switch) to control the output timing parameters of a single POL regulator. Thus, it would be advantageous to have a system and method of controlling the output timing parameters of a POL regulator that overcomes these drawbacks.

SUMMARY OF THE INVENTION

The present invention provides a system and method of utilizing output-timing data to control at least one output timing parameter of a point-of-load ("POL") regulator. Embodiments of the present invention operate in accordance with a power supply controller ("controller") and at least one POL regulator. Specifically, in one embodiment of the present invention, each POL regulator includes an output builder, a control unit and a storage device. In this embodiment, the controller is adapted to transmit output-timing data to the regulator via a bus, or more particularly to the control unit (e.g., microprocessor, etc.) located within the POL regulator. The output-timing data is then stored in the storage device and used by the control unit and the output builder (e.g., voltage generating device, etc.) to produce an output.

Specifically, POL regulators are traditionally adapted to receive voltage set-point data and produce an output having a voltage level in accordance with the voltage set-point data. In a preferred embodiment of the present invention, the POL regulator is further adapted to receive output-timing data and utilize the output-timing data to determine at least one output timing parameter. Examples of output timing parameters include when to generate the output (e.g., sequencing data, turn-on data), when to stop generating the output (e.g., termination data, turn-off data), the slew rate of the output (e.g., slew-rate data), etc. For example, a POL regulator operating in accordance with one embodiment of the present invention may utilize the output-timing data, or a portion thereof (e.g., slew-rate data), to generate an output having a particular slew rate. Similarly, a POL regulator operating in accordance with one embodiment of the present invention may utilize the output-timing data, or a portion thereof (e.g., sequencing data, turn-on data), to determine (or calculate) a period of time to wait (e.g., delay period) before the output is generated. In other words, at least a portion of the output-timing data can be used to generate a series of outputs in a particular order, or sequence. For example, a first POL regulator may produce a one volt output ten milliseconds after an event has occurred (e.g., activation data has been received, etc.), a second POL regulator may produce a five volt output two milliseconds after the event has occurred, etc.

A more complete understanding of the system and method of utilizing output-timing data to control at least one output timing parameter of a POL regulator will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a system and method of utilizing output-timing data to control at least one output timing parameter of a POL regulator. In the detailed description that follows, like element numerals are used to describe like elements illustrated in one or more figures.

Figure 1:
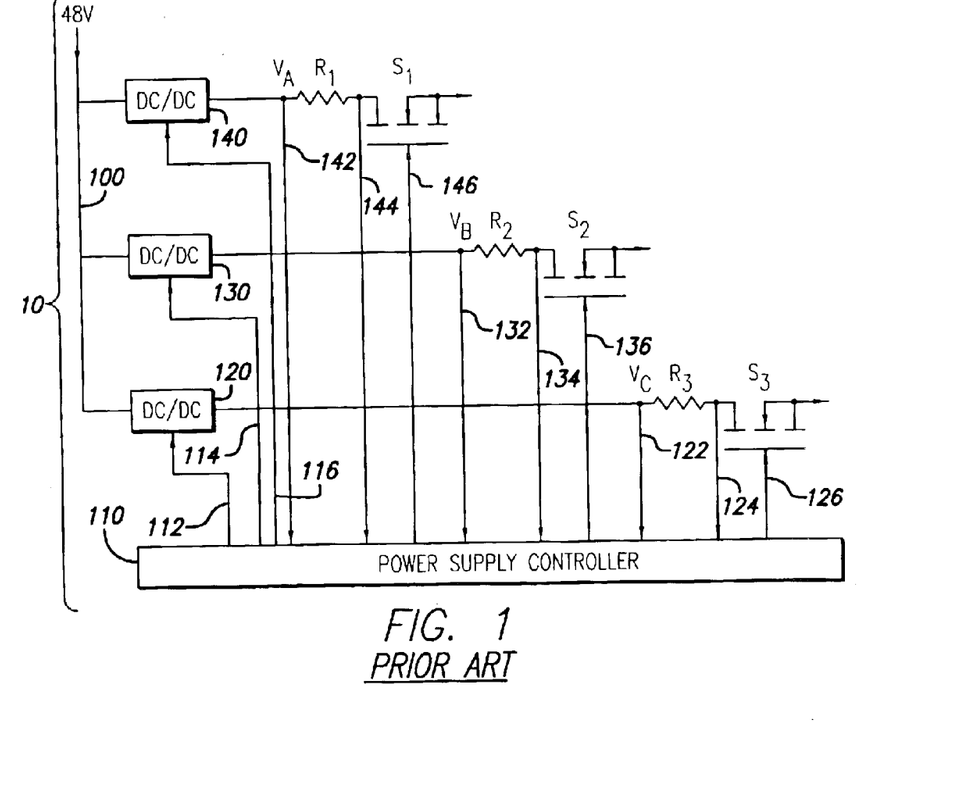
FIG. 1 depicts a prior art POL or DC/DC control system.

FIG. 1 illustrates a prior art DC/DC control system 10 where the power supply controller ("controller") 110 communicates with a plurality of DC/DC converters (i.e., 120, 130 and 140), also referred to as voltage regulators or POL regulators, via a plurality of six bit parallel buses (i.e., 112, 114 and 116), and a plurality of external circuits (e.g., R1/S1, R2/S2, R3/S3) via a plurality of three-wire output connections (i.e., 122–126, 132–136, and 142–146). More particularly, each six bit parallel bus includes an enable/disable bit and five VID code bits, and each three-wire output connection includes a voltage monitoring line (i.e., 122, 132 and 142), a current monitoring line (i.e., 124, 134 and 144), and a switch enable line (i.e., 126, 136, 146).

As shown in FIG. 1, the controller 110 controls the output voltage of each DC/DC converter by activating and partially programming the converter via the six bit parallel bus, and monitoring the converter via the three-wire output connection. For example, the controller 110 provides output-voltage-set-point data to the DC/DC converter 140 via the VID code portion of the six bit parallel bus 116. The controller 110 then activates the DC/DC converter 140 via the enable/disable portion of the six bit parallel bus 116. Once activated, and in accordance with the output-voltage-set-point data, the DC/DC converter 140 converts the voltage provided via the power supply 100 (e.g., 48v) into an output voltage $V_A$. The controller 110 then verifies that the output voltage $V_A$ is the desired voltage by measuring the voltage via the voltage monitoring line 142. If the output voltage $V_A$ is acceptable, it is provided to the load (not shown) by activating the transistor switch $S_1$ via the switch enable line 146. The controller 110 can then continuously monitor the output voltage and the output current by measuring the voltage via the voltage monitoring line 142 and measuring the voltage drop across the sense resistor $R_1$ (i.e., the voltage differential between the current monitoring line 144 and the voltage monitoring line 142), respectively. If a particular slew rate is required, the controller 110 can toggle or control linearly the transistor switch $S_1$ via the switch enable line 146 to produce the desired slew rate. The controller 110 communicates (i.e., partially programs, activates, monitors, and controls the output) with the remaining DC/DC converters 120, 130 in the same manner.

The problem with such a control system 10 is that it adds complexity, expense and size to the overall electronic device (not shown) by requiring the controller 110 to communicate with multiple devices in order to control the output of a DC/DC converter (e.g., 140). For example, in order to generate and provide an output voltage to an external load circuit, the controller must communicate with the DC/DC converter (to produce a particular output voltage) and the external transistor switch (to allow the output voltage to be provided to the external load circuit). Not only does such a system require several external circuits (e.g., external transistor switches), but it also requires additional wires (or traces) in order to communicate with the external circuits.

Figure 2:
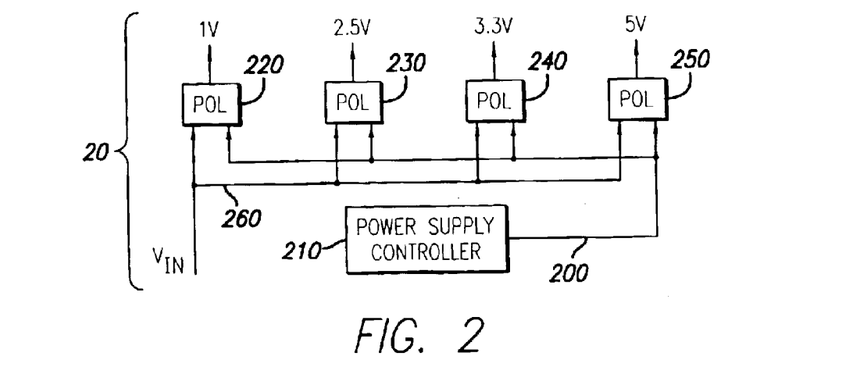
FIG. 2 depicts a POL control system operating in accordance with one embodiment of the present invention.

FIG. 2 illustrates a POL control system 20 operating in accordance with one embodiment of the present invention. Specifically, a controller 210 is used to communicate with a plurality of POL regulators (i.e., 220, 230, 240 and 250) via a bus 200. In one embodiment of the present invention, this communication includes providing voltage set-point data and enable data to each POL regulator. The data is then used by each POL regulator to convert the input voltage (i.e., $V_{IN}$) provided via the power bus 260 into an output voltage. Specifically, after each POL regulator has been activated (i.e., receives enable data), it produces an output having a voltage level in accordance with the voltage set-point data. For example, if the voltage set-point data corresponds to one volt, then the POL regulator will produce a one volt output. It should be appreciated that the POL regulators depicted herein (e.g., 220, etc) include, but are not limited to, point-of-load regulators, power-on-load regulators, DC/DC converters, voltage regulators, and all other programmable voltage or current regulating devices (including all single and multiple output devices) generally known to those skilled in the art. It should further be appreciated that the controller (e.g., 210) may exist as a stand-alone device (as depicted in FIG. 2) or integrated into another device, such as a front-end converter (not shown) or another POL regulator.

In a preferred embodiment of the present invention, the controller 210 is further adapted to identify at least one output timing parameter of a POL regulator by transmitting output-timing data to the POL regulator. For example, in response to being activated (i.e., receiving enable data), a POL regulator may generate an output having a particular slew rate in accordance with at least a portion of the output-timing data, (e.g., slew-rate data). Similarly, after being activated, a POL regulator may wait a period of time before generating an output—where the period of time either corresponds to at least a portion of the output-timing data (e.g., sequencing data) or is calculated using at least a portion of the output-timing data (e.g., turn-on data). In other words, the delay period can either be provided by the controller 210 (e.g., sequencing data) or calculated using data that has been provided by the controller 210 (e.g., turn-on data).

For example, a POL regulator might generate a one volt output five milliseconds after receiving activation data if it received voltage set-point data and sequencing data corresponding to one volt and five milliseconds, respectively. Alternatively, a POL regulator might generate a one volt output one millisecond after receiving activation data if it received voltage set-point data, slew-rate data and turn-on data corresponding to two volts, one volt per millisecond and three milliseconds, respectively. This is because it takes two milliseconds to produce a two volt output at a slew rate of one volt per millisecond. In other words, a one millisecond delay period plus a two millisecond voltage ramp-up period equals three milliseconds (e.g., turn-on data). It should be appreciated, however, that the time measurements discussed herein are not limited to measurements taken from (or even used in conjunction with) the reception of enable or activation data. Thus, time measurements taken from any known event (e.g., the reception of a particular transmission cycle or data bit, the occurrence of a particular condition, etc.) are within the spirit and scope of the present invention. It should further be appreciated that the terms generated and produced as used herein are used to indicate a point-in-time (approximately) when an output is being provided by the POL (e.g., to an external load), regardless of whether the output is at its peak voltage or ramping up to its peak voltage. Thus, an output of five volts is being generated or produced at the time it is being provided by (or delivered external to) the POL, regardless of whether the output is five volts at the time it's initially provided or ramping up to five volts. It should also be appreciated that the output timing parameters associated with the output-timing data, and therefore the output-timing data itself, are not limited to slew rate, sequencing or turn-on parameters, but further include all other output timing parameters generally known to those skilled in the art. Thus, for example, output-timing data may be used to determine when a POL regulator is to turn-off its output (e.g., termination data or turn-off data).

Figure 3:
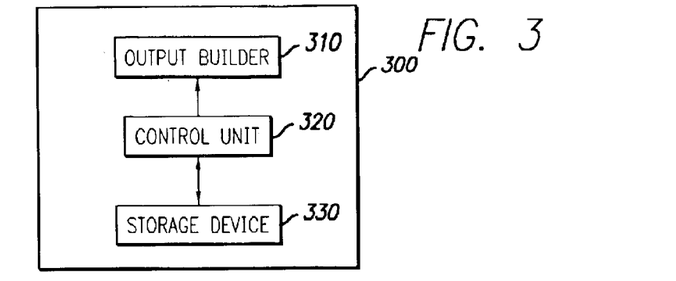
FIG. 3 depicts a POL regulator operating in accordance with one embodiment of the present invention.

In one embodiment of the present invention, as shown in FIG. 3, each POL regulator 300 includes an output builder 310, a point-on-load control unit 320 ("POL control unit") and a storage device 330. It should be appreciated that the output builder 310 includes, but is not limited to, all voltage building and converting circuits generally known to those skilled, including circuits that are single and multi-staged (e.g., circuits that include a digital to analog converter, a pulse width modulation controller, an analog voltage reference circuit, etc.). It should further be appreciated that the POL control unit 320 includes, but is not limited to, application specific integrated circuits (ASICs), processors, microprocessors, programmable devices and all other computing devices generally known to those skilled in the art. It should also be appreciated that the storage device 330 can be a long term or short term storage device, including, but not limited to, registers, RAM, ROM, EPROM, EEPROM, flash memory, and all other digital data storage devices generally known to those skilled in the art.

Referring to FIG. 3, the POL control unit 320 is adapted to receive output-timing data and store the output-timing data in the storage device 330. For example, if the storage device 330 is a plurality of registers, the output-timing data may be stored in at least one output-timing register (e.g., a sequencing register, a slew-rate register, etc.). This data is then used by the control unit 320 (or to some degree the output builder 310) to generate an output. Specifically, the output builder 310 is adapted to generate an output in accordance with data received/stored by the control unit 320 (e.g., voltage set-point data, output-timing data, etc.). For example, in accordance with one embodiment of the present invention, the output builder 310 and the control unit 320 are adapted to generate an output that includes a particular slew rate, or an output that is to be produced at a particular time, etc.—depending upon the type of output-timing data received/stored. It should be appreciated that the location, type, and/or number of components illustrated in FIG. 3 are merely to exemplify the environment in which the present invention operates, and should not be considered limitations of the present invention. For example, a POL regulator including more than one output builder, having components in different locations (e.g., a storage device within the POL control unit, a storage device external to the POL regulator, etc.), or having additional (or fewer) components is within the spirit and scope of the present invention.

While the output-timing data can be transmitted via a parallel bus, one embodiment of the present invention involves transmitting the output-timing data over a bi-directional serial data bus (either synchronously or asynchronous) (see e.g., FIG. 2, bus 200). In other words, the bi-directional serial bus is either a two-wire serial data bus (e.g., I²C) that allows data to be transmitted asynchronously or a single-wire serial data bus that allows data to be transmitted synchronously (i.e., synchronized to a clock signal). In another embodiment of the present invention the serial data bus (or a portion thereof) is superimposed over (or coexistent with) a power bus used to deliver power from the front-end converter to the POL regulators (see e.g., FIG. 2, power bus 260).

Figure 4:
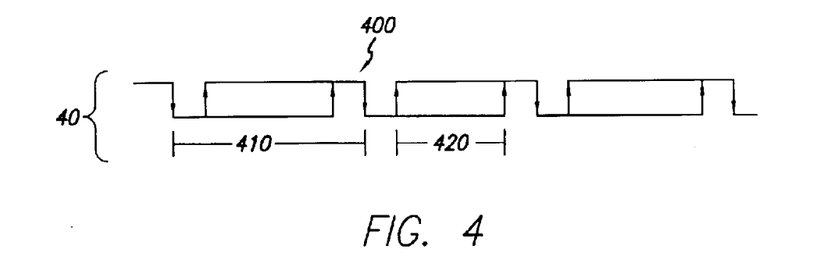
FIG. 4 illustrates one method of communicating with a POL regulator over a serial bus.

FIG. 4 illustrates one method of communicating over a single-wire serial bus. Specifically, a transmission line 40 is created by propagating a clock signal 400 over the serial bus. The clock signal 400 can be generated by the controller, a particular POL regulator (e.g., the POL regulator with the least significant address), or an external device. The clock signal 400 synchronizes the various communicating devices (i.e., the POL regulators and the controller) and creates a series of clock cycles 410, each one including a data bit 420. This allows the various communicating devices to transmit a single bit of data for every clock cycle 410. In other words, each communicating device transmits data by leaving/pulling the data bit 420 high or low (i.e., binary one or zero). It should be appreciated that FIG. 4, as discussed herein, is not intended to limit the present invention, but to provide an example as to how communication can occur over a single-wire serial bus.

Figure 5:
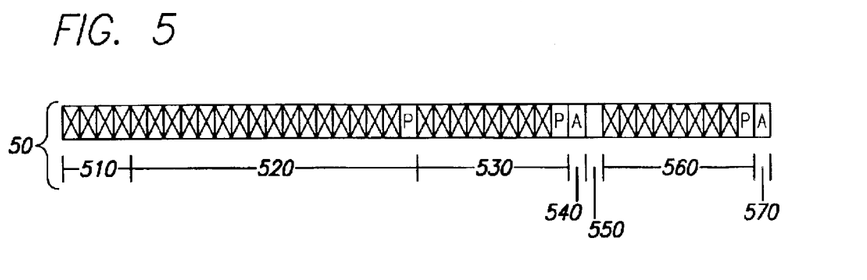
FIG. 5 illustrates one communication cycle that may be transmitted to/from a POL regulator.

FIG. 5 illustrates one method of transmitting information between the controller and at least one POL regulator. Specifically, a forty-two bit communication cycle 50 can be used to transmit output-timing data, voltage set-point data, and/or enable data. As shown in FIG. 5, the forty-two bit transmission cycle 50 includes a four bit start sequence 510, a sixteen bit (with parity) address set 520, an eight bit (with parity) command set 530, a first acknowledgement bit 540, an eight bit (with parity) data set 560, and a second acknowledge bit 570. An additional bit 550 has been added to ensure that the command set 540 is executed before the data set 560 is provided. It should be appreciated that the communication cycle 50 depicted in FIG. 5 is not intended to limit the present invention, but to illustrate how information can be transmitted over a serial bus. Therefore, communication cycles containing more or less information and/or bits is within the spirit and scope of the present invention.

The first and second acknowledgement bits 540, 570 are used to acknowledge the reception of the command set 530 and the data set 560, respectively. It should be appreciated that the device responsible for providing the first and second acknowledgement bits 540, 570 varies depending upon whether the information is being sent to or from the POL regulator (i.e., whether the information is being written, read, or provided).

The command set 530, data set 560, and address set 520 enable the controller and the POL regulators to write, read and provide data. Specifically, (i) the command set 530 is used to identify whether and what the controller is writing (e.g., writing to the output-timing register), the controller is reading (e.g., reading the status register), or the POL regulator is providing (e.g., providing output-timing data), (ii) the address set 520 is used to identify the POL regulator(s) that is being written to or read, or the POL regulator that is providing information, and (iii) the data set 560 is used to identify the actual data that is being written, read, or provided. The start sequence 510 and address set 520 are used, in part, to identify the sender of the information. For example, the controller uses a different start sequence 510 than the POL regulators. Thus, the controller can determine, by reading the start sequence 510 of the communication cycle 50 being transmitted, whether a POL regulator is also attempting to send a communication cycle 50 at the same time. Similarly, each POL regulator has a different address set 520. Thus, a POL regulator can determine, by reading the start sequence 510 and address set 520 of the communication cycle 50 being transmitted, whether another POL regulator or the controller is also attempting to send a communication cycle 50 at the same time. If multiple devices are attempting to send a communication cycle 50, bus-arbitration data is used to allocate or arbitrate bus use. It should be appreciated that the bus-arbitration data can either be stored (or hard wired) as a default value or provided by the power supply controller and stored in the POL storage device.

Figure 6:
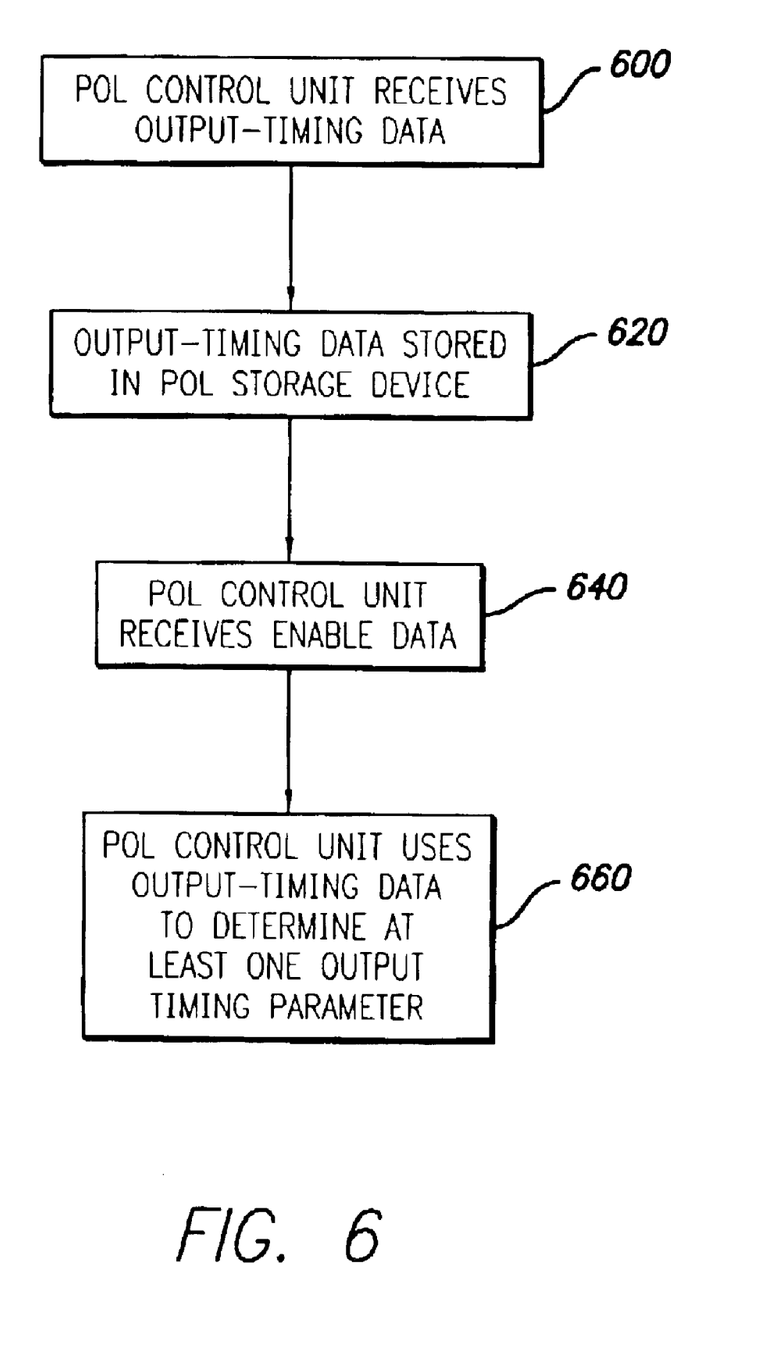
FIG. 6 is a flow chart depicting one method of utilizing output-timing data in accordance with the present invention.

One method of utilizing output-timing data to determine at least one output timing parameter is illustrated in FIG. 6.

Specifically, at step 600, the POL control unit receives output-timing data, which may include slew-rate data, sequencing data, termination data, etc. The output-timing data is then stored in the POL storage device at step 620. For example, if the POL storage device is a plurality of registers, then the output-timing data (e.g., slew-rate data, sequencing data, etc.) may be stored in at least one of the plurality of registers (e.g., a slew-rate register, a sequencing register, etc.). At step 640, the POL control unit receives enable data, which activates the POL regulator for the production of an output. At step 660, the POL control unit uses the output-timing data stored in the POL storage device to determine at least one output timing parameter. It should be appreciated, however, that step 660 may be (at least in part) more applicable during certain time periods, depending on the nature of the output-timing data. For example, if the output-timing data is related to the time in which the output is to be generated or the slew rate of the output, step 660 may be more applicable to producing the output. Alternatively, if, for example, the output-timing data is related to the time in which the output is to be terminated, step 660 may be more applicable after the output has been produced.

Having thus described a preferred embodiment of a system and method of utilizing output-timing data to control at least one output timing parameter of a point-of-load regulator, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A power control system comprising:
   a power supply controller adapted to transmit output data;
   a data bus connected to said power supply controller; and
   at least one point-of-load ("POL") regulator connected to said data bus, said at least one POL regulator comprising:
      a storage device adapted to store said output data;
      an output builder adapted to generate an output; and
      a control unit adapted to determine at least one timing parameter of said output in accordance with said output data.

2. A power control system comprising:
   a power supply controller adapted to transmit output data;
   a data bus connected to said power supply controller; and
   at least one point-of-load ("POL") regulator connected to said data bus, said at least one POL regulator comprising:
      a storage device adapted to store said output data;
      an output builder adapted to generate an output; and
      a control unit adapted to determine at least one timing parameter of said output in accordance with said output data;
   wherein said output data further comprises at least one of turn-on data providing a command to turn-on the corresponding POL regulator, voltage set-point data providing a desired output voltage of the corresponding POL regulator, slew-rate data providing a rate of change of output voltage of the corresponding POL regulator, turn-off data providing a command to turn off the corresponding POL regulator, and sequencing data providing a delay period between either a turn-on or turn-off command and actual generation of a corresponding output.

3. The power control system of claim 2, wherein said control unit is further adapted to determine a turn-on period of time to generate desired output in accordance with at least one of said turn-on data, said sequencing data, said slew rate data, and said voltage set point data.

4. The power control system of claim 2, wherein said control unit is further adapted to determine a turn-off period of time to terminate a selected output in accordance with at least one of said turn-off data, said sequencing data, said slew rate data, and said voltage set point data.

5. The power control system of claim 3, wherein said turn-on period is provided by said power supply controller in said sequencing data.

6. The power control system of claim 3, wherein said turn-on period is calculated by said control unit using said sequencing data, said slew rate data, and said voltage set point data.

7. The power control system of claim 1, wherein said storage device further comprises at least one register.

8. The power control system of claim 1, wherein said data bus further comprises a bi-directional serial bus.

9. A method of determining at least one output-timing parameter of at least one point-of-load ("POL") regulator comprising:
   receiving output-timing data from a controller;
   storing said output-timing data in a POL storage device;
   generating an output of said at least one POL regulator; and
   using said output-timing data to determine at least one timing parameter of said output.

10. A method of determining at least one output-timing parameter of at least one point-of-load ("POL") regulator comprising:
    receiving output-timing data from a controller;
    storing said output-timing data in a POL storage device;
    generating an output of said at least one POL regulator; and
    using said output-timing data to determine at least one timing parameter of said output;
    wherein said step of receiving output-timing data further comprises receiving sequencing data and said step of using said output-timing data further comprises using said sequencing data to determine when said output should be generated.

11. A method of determining at least one output-timing parameter of at least one point-of-load ("POL") regulator comprising:
    receiving output-timing data from a controller;
    storing said output-timing data in a POL storage device;
    generating an output of said at least one POL regulator; and
    using said output-timing data to determine at least one timing parameter of said output;
    wherein said step of receiving output-timing data further comprises receiving slew-rate data and said step of using said output-timing data further comprises using said slew-rate data to determine the slew rate of said output.

12. A method of determining at least one output-timing parameter of at least one point-of-load ("POL") regulator comprising:
    receiving output-timing data from a controller;
    storing said output-timing data in a POL storage device;
    generating an output of said at least one POL regulator; and
    using said output-timing data to determine at least one timing parameter of said output;

wherein said step of receiving output-timing data further comprises receiving turn-off data and said step of using said output-timing data further comprises using said turn-off data to calculate a turn-off delay period corresponding to when said output is to be turned off.

13. A method of determining at least one output-timing parameter of at least one point-of-load ("POL") regulator comprising:

receiving output-timing data from a controller;
storing said output-timing data in a POL storage device;
generating an output of said at least one POL regulator; and
using said output-timing data to determine at least one timing parameter of said output;
wherein said step of receiving output-timing data further comprises receiving turn-on data and said step of using said output-timing data further comprises using said turn-on data to calculate a turn-on delay period corresponding to when said output should be generated.

14. The method of claim 9, further comprising receiving enable data from said controller.

15. A method determining at least one output-timing parameter of at least one point-of-load ("POL") regulator comprising:

receiving output-timing data from a controller;
storing said output-timing data in a POL storage device;
generating an output of said at least one POL regulator;
using said output-timing data to determine at least one timing parameter of said output; and
receiving enable data from said controller;
wherein said step of receiving output-timing data further comprises receiving sequencing data and said step of using said output-timing data further comprises using said sequencing data and said enable data to determine when said output should be generated.

16. A method of determining at least one output timing parameter of at least one point-of-load ("POL") regulator comprising:

receiving slew-rate data from a controller;
storing said slew-rate data in a POL storage device;
receiving enable data from said controller; and
using said slew-rate data to determine the slew-rate of an output of said at least one POL regulator.

17. A method of determining at least one output timing parameter of at least one point-of-load ("POL") regulator comprising:

receiving slew-rate data from a controller;
storing said slew-rate data in a POL storage device;
receiving enable data from said controller;
using said slew-rate data to determine the slew-rate of an output of said at least one POL regulator;
receiving sequencing data from said controller;
storing said sequencing data in said POL storage device; and
using said sequencing data to determine when said output is to be produced.

18. The method of claim 17, wherein said step of using said sequencing data to determine when said output is to be provided further comprises waiting a period of time after said enable data has been received before said output is produced, said period of time being determined by said sequencing data.

19. A method of determining at least one output timing parameter of at least one point-of-load ("POL") regulator comprising:

receiving stew-rate data from a controller;
storing said slew-rate data in a POL storage device;
receiving enable data from said controller;
using said slew-rate data to determine the slew-rate of an output of said at least one POL regulator;
receiving turn-on data from said controller;
storing said turn-on data in said POL storage device; and
using at least said turn-on data and said slew-rate data to calculate a turn-on delay period corresponding to when said output is to be produced.

20. A method of determining at least one output timing parameter of at least one point-of-load ("POL") regulator comprising:

receiving slew-rate data from a controller;
storing said slew-rate data in a POL storage device;
receiving enable data from said controller;
using said slew-rate data to determine the slew-rate of an output of said at least one POL regulator;
receiving turn-off data from said controller;
storing said turn-off data in said POL storage device; and
using said turn-off data and said slew-rate data to calculate a turn-off delay period corresponding to when said output is to be terminate.

21. A point-of-load regulator comprising:
a serial data bus interface;
a storage device adapted to store output data received externally via said serial data bus interface;
a control unit adapted to calculate at least one timing parameter based on said output data; and
an output builder adapted to generate an output voltage in accordance with said at least one timing parameter.

22. A point-of-load regulator comprising:
a serial data bus interface;
a storage device adapted to store output data received externally via said serial data bus interface;
a control unit adapted to calculate at least one timing parameter based on said output data; and
an output builder adapted to generate an output voltage in accordance with said at least one timing parameter;
wherein said output data further comprises sequencing data and said control unit is further adapted to calculate a time when said output voltage is to be generated, said time being determined in accordance with said sequencing data.

23. A point-of-load regulator comprising:
a serial data bus interface;
a storage device adapted to store output data received externally via said serial data bus interface;
a control unit adapted to calculate at least one timing parameter based on said output data; and
an output builder adapted to generate an output voltage in accordance with said at least one timing parameter;
wherein said output data further comprises slew-rate data and said control unit is further adapted to determine a slew rate for said output voltage, said slew rate being determined in accordance with said slew-rate data.

24. A point-of-load regulator comprising:
a serial data bus interface;
a storage device adapted to store output data received externally via said serial data bus interface;
a control unit adapted to calculate at least one timing parameter based on said output data; and an output builder adapted to generate an output voltage in accordance with said at least one timing parameter;

wherein said output data further comprises turn-off data and said control unit is further adapted to calculate a turn-off period of time that is to be waited before said control unit terminates said output, said turn-off data being used to calculate said turn-off period of time.

25. A point-of-load regulator comprising:

a serial data bus interface;

a storage device adapted to store output data received externally via said serial data bus interface;

a control unit adapted to calculate at least one timing parameter based on said output data; and an output builder adapted to generate an output voltage in accordance with said at least one timing parameter;

wherein said output data further comprises turn-on data and said control unit is further adapted to calculate a turn-on period of time that is to be waited before said control unit produces said output voltage, said turn on data being used to calculate said turn-on period of time.

26. A point-of-load regulator comprising:

a serial data bus interface;

a storage device adapted to store output data received externally via said serial data bus interface;

a control unit adapted to calculate at least one timing parameter based on said output data; and an output builder adapted to generate an output voltage in accordance with said at least one timing parameter;

wherein said output data further comprises at least one of turn-on data providing a command to turn-on the corresponding POL regulator, voltage set-point data providing a desired output voltage of the corresponding POL regulator, slew-rate data providing a rate of change of output voltage of the corresponding POL regulator, sequencing data providing a delay period between execution of other functions by the corresponding POL regulator, and turn-off data providing a command to turn off the corresponding POL regulator.

27. A point-of-load regulator comprising:

a serial data bus interface;

a storage device adapted to store output data received externally via said serial data bus interface;

a control unit adapted to calculate at least one timing parameter based on said output data; and an output builder adapted to generate an output voltage in accordance with said at least one timing parameter;

wherein said control unit is further adapted to determine a turn-on period to generate a desired output in accordance with at least one of said turn-on data, said sequencing data, said slew rate data, and said voltage set point data.

28. The point-of-load regulator of claim 27, wherein said turn-on period is provided in said sequencing data.

29. The point-of-load regulator of claim 27, wherein said turn-on period is calculated by said control unit using said sequencing data, said slew rate data, and said voltage set point data.

30. The point-of-load regulator of claim 26, wherein said control unit is further adapted to determine a turn-off period of time to terminate a selected output in accordance with at least one of said turn-off data, said sequencing data, said slew rate data, and said voltage set point data.

31. The point-of-load regulator of claim 30, wherein said turn-off period is provided in said sequencing data.

32. The point-of-load regulator of claim 30, wherein said turn-off period is calculated by said control unit using said sequencing data, said slew rate data, and said voltage set point data.

33. The point-of-load regulator of claim 21, wherein said storage device further comprises at least one register.

34. The power control system of claim 4, wherein said turn-off period is provided in said sequencing data.

35. The power control system of claim 4, wherein said turn-off period is calculated by said control unit using said sequencing data, said slew rate data, and said voltage set point data.

* * * * *

UNITED STATES PATENT AND TRADEMARK OFFICE
CERTIFICATE OF CORRECTION

| | | |
|---|---|---|
| PATENT NO. | : 6,936,999 B2 | Page 1 of 1 |
| APPLICATION NO. | : 10/388831 | |
| DATED | : August 30, 2005 | |
| INVENTOR(S) | : Alain Chapuis | |

It is certified that error appears in the above-identified patent and that said Letters Patent is hereby corrected as shown below:

On page 10, column 10, line 26 (Claim 20), "terminate" should be changed to -- terminated --.

On page 11, column 12, line 9 (Claim 27) (after the paragraph that recites "an output builder adapted to generate an output voltage in accordance with said at least one timing parameter;"), please insert the following paragraph:

-- wherein said output data further comprises at least one of turn-on data providing a command to turn-on the corresponding POL regulator, voltage set-point data providing a desired output voltage of the corresponding POL regulator, slew-rate data providing a rate of change of output voltage of the corresponding POL regulator, sequencing data providing a delay period between execution of other functions by the corresponding POL regulator, and turn-off data providing a command to turn off the corresponding POL regulator; --

Signed and Sealed this

Twenty-fifth Day of July, 2006

JON W. DUDAS
*Director of the United States Patent and Trademark Office*

UNITED STATES PATENT AND TRADEMARK OFFICE
Certificate

Patent No. 6,936,999 B2                        Patented: August 30, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Alain Chapuis, Morgan Hill, CA (US); Mikhail Guz, Daly City, CA (US).

Signed and Sealed this Seventh Day of August 2007.

KARL D. EASTHOM
                                                            *Supervisory Patent Examiner*
                                                                    Art Unit 2838